United States Patent [19]

McCracken et al.

[11] 3,725,486
[45] Apr. 3, 1973

[54] PROCESS FOR MAKING 1,1-DICHLORETHYLENE FROM 1,1,2-TRICHLORETHANE

[75] Inventors: William L. McCracken, Southfield; Wilbur H. Petering; Charles E. Kircher, Jr., both of Detroit; Paul R. Pinchak, Saint Clair Shores, all of Mich.

[73] Assignee: Detrex Chemical Industries, Inc., Detroit, Mich.

[22] Filed: May 23, 1969

[21] Appl. No.: 827,139

[52] U.S. Cl. ............................................. 260/654 D
[51] Int. Cl. ............................................. C07c 21/20
[58] Field of Search ................................. 260/654 D

[56] References Cited

UNITED STATES PATENTS

| | | |
|---|---|---|
| 3,290,398 | 12/1966 | Richtzenhain et al. .............. 260/654 |
| 2,291,375 | 7/1942 | Cass ..................................... 260/654 |

Primary Examiner—Leon Zitver
Assistant Examiner—A. Siegel
Attorney—Paul & Paul

[57] ABSTRACT

A dehydrochlorination process for the formation of 1,1-dichlorethylene from 1,1,2-trichlorethane in which an aqueous emulsion of 1,1,2-trichlorethane and an alkaline earth metal hydroxide is made to which there is added an aqueous solution of an alkali metal hydroxide in stoichiometric amount, thereby forming 1,1-dichlorethylene, which is continuously removed.

9 Claims, No Drawings

PROCESS FOR MAKING 1,1-DICHLORETHYLENE FROM 1,1,2-TRICHLORETHANE

This invention relates to a method of preparing an emulsion of a polychlorinated ethane and water by means of calcium or magnesium oxide and their corresponding hydroxides and the subsequent dehydrochlorination of the polychlorinated ethane to the corresponding chlorinated ethylene by addition of an aqueous solution of alkali metal hydroxide. More particularly, this invention relates to a method of preparing an emulsion of 1,1,2-trichlorethane and water by means of calcium or magnesium oxide or their corresponding hydroxides, and then dehydrochlorinating the 1,1,2-trichlorethane to 1,1-dichlorethylene (vinylidene chloride) by addition of an aqueous solution of alkali metal hydroxide to the emulsion.

In the chlorination of ethylene, besides the formation of 1,2-dichlorethane (ethylene dichloride) by addition of chlorine to the ethylene, there can be formed other polychlorinated ethanes by substitution chlorination. These polychlorinated ethanes, including 1,1,2-trichlorethane (beta-trichlorethane), symmetric and assymmetric tetrachlorethane, and pentachlorethane, can all be dehydrochlorinated to corresponding chlorethylenes which are used commercially. For example, 1,2-dichlorethane yields vinyl chloride, the well-known monomer for the production of polyvinyl chloride; the tetrachlorethanes yield trichlorethylene, a widely used industrial degreasing solvent; and pentachlorethane yields perchlorethylene, the widely used non-flammable drycleaning solvent. The 1,1,2-trichlorethane yields all three isomeric dichlorethylenes by one method of dehydrochlorination, and predominantly only one of the dichlorethylenes, namely, 1,1-dichlorethylene by another method.

The classical method of dehydrochlorinating these polychlorethanes was the method employing an aqueous suspension of an alkaline earth metal hydroxide such as calcium or barium hydroxide. More recently, it has been proposed that this classical alkaline dehydrochlorination method be replaced by a method employing an aqueous solution of an alkali metal hydroxide dispersed in the organic chlorethane phase by means of powerful mixing devices. In this method because of the specific gravity differences between the phases, mixing must be maintained by the devices to prevent phase separation.

Because the classical alkaline dehydrochlorinating process has certain deficiencies, to be described in detail later, other dehydrochlorinating methods were sought. Thus the vapor phase thermal and catalytic dehydrochlorination processes were developed. In the case of dichlorethane, tetrachlorethanes and pentachlorethane, the major organic products of the thermal or catalytic dehydrochlorination are essentially those obtained by the alkaline dehydrochlorination method. However, in the case of 1,1,2-trichlorethane, the three isomeric dichlorethylenes (cis and trans 1,2-dichlorethylene and 1,1-dichlorethylene) are formed in about equal quantities in the thermal or catalytic dehydrochlorination. Of these three isomers only 1,1-dichlorethylene has found wide use. In addition to its use as a monomer for polymer production, it has also become an intermediate for the production of another chlorethane, namely, 1,1,1-trichlorethane (methyl chloroform) which is beginning to find use as an industrial degreasing solvent.

Therefore, in the dehydrochlorination of 1,1,2-trichlorethane (also called beta-trichlorethene) that method which yeilds predominantly the 1,1-dichlorethylene isomer is preferred. Alkaline dehydrochlorination of beta-trichlorethane yields essentially 100 percent 1,1-dichlorethylene. However, all the alkaline dehydrochlorination methods known have certain inherent and serious deficiencies. The classical method uses lime as the dehydrochlorinating agent. This method suffers from the following disadvantages:

1. The water solubility of lime and its hydroxide, calcium hydroxide, is limited. Since it is known that primarily only the solubilized hydroxide dehydrochlorinates the chlorethane, the availability of hydroxyl ions controls the rate at which the dehydrochlorination takes place.
2. Because calcium hydroxide has an inverse temperature solubility, the attempt to increase the rate of the dehydrochlorination reaction by elevating the temperature decreases the solubility of the hydroxide, which in turn decreases the extent to which the reaction takes place.
3. The chloride of lime which forms as a by product of the dehydrochlorination reaction is very water soluble. The mass-action effect of the common metal ion on the solubility of calcium hydroxide further reduces the solubility of the hydroxide as the reaction progresses and, therefore, limits the degree of conversion of the chlorethane to chlorethylene.

In the case of magnesium hydroxide, the solubility of the hydroxide is so low that the concentration of hydroxyl ion is too small (pH of the solution too low) to bring about any appreciable dehydrochlorination of the polychlorethanes.

As a result of these factors, dehydrochlorination by means of calcium or magnesium hydroxide reaches an equilibrium when only a part of the chloralkane has been dehydrochlorinated, even though large excesses of the hydroxide are present.

One advantage, however, of the calcium and magnesium hydroxides is that they produce an aqueous solution having a controlled pH range. In the case of magnesium hydroxide this pH is not high enough to cause any degree of dehydrochlorination of chlorethylene to acetylenic compounds.

To overcome the above cited deficiencies of the alkaline earth metal hydroxides, attempts have been made to use alkali metal hydroxides such as sodium or potassium hydroxide for dehydrochlorination. Difficulties in obtaining homogeneity of the water solution of the alkali metal hydroxide and the organic chloralkane led to the use of co-solvents such as polyglycols or ether derivatives of these. In nonhomogeneous systems where chemicals are added in small quantities as catalysts, as in U. S. Pat. No. 2,322,258, there is a danger of dehydrochlorination to form explosive acetylenic compounds. If co-solvents are used in large quantities to dilute the alkali metal hydroxide and act as heat transfer media, expensive recovery systems must be used because the costly co-solvents must be recovered efficiently.

More recently, methods have been suggested in which aqueous alkali metal hydroxide solutions are dispersed in the chloralkane phase without the use of co-solvents, by means of relatively powerful mixing devices. It is acknowledged that this is feasible; however, if at any time a failure of the mechanical mixing device occurs, a situation develops due to phase separation in which little or no control is available to prevent dehydrochlorination of the newly formed polychloralkene to acetylenic compounds which are extremely hazardous.

In order to obtain the highest yield of vinylidene chloride from beta-trichlorethane, alkaline dehydrochlorination is required, and yet a completely satisfactory process has not been demonstrated.

It has now been discovered that an aqueous suspension of an alkaline earth metal hydroxide, such as calcium or magnesium hydroxide, is an effective emulsifying agent capable of forming water emulsions of chloralkane liquids. The emulsifying ability is most effective when the alkaline earth metal hydroxide is used as a slurry, having from about 5 percent to about 30 percent solids by weight in a volume ratio of slurry to organic liquid between 1:2 and 2:1. There is thus formed a stable emulsion of chloralkane and aqueous suspension of alkaline earth hydroxide, to which it is possible to continuously add a solution of an alkali metal hydroxide at a controlled rate and bring about rapid and complete monodehydrochlorination of the polychloralkane without having large amounts or high concentrations of hydroxyl ion in contact with the chloralkane phase. This can be done at a temperature below 100°C. and more particularly at the steam distillation temperature. The aqueous solution of alkali metal hydroxide may be very dilute or it may be concentrated to as high as 50 percent by weight. By controlling the rate of alkali addition, a high concentration of unreacted hydroxide does not accumulate in the system and as a result essentially no dehydrochlorination of the chloralkene to acetylenic compounds occurs.

The emulsion of the aqueous suspension of calcium or magnesium hydroxide and the chloralkane is formed so easily and is so stable that it can be produced with the mildest type of agitation. Moreover, in the absence of mechanical agitation, once the emulsion is formed it is maintained by a minimum amount of agitation of any type.

The ensuring dehydrochlorination is carried out at ambient or elevated temperatures and atmospheric or elevated pressures, and after the dehydrochlorination of the polychloralkane is complete and the chloralkene has been recovered by distillation, the now diluted aqueous suspension of calcium or magnesium hydroxide can be stored. The water phase contains the dissolved alkali metal chloride resulting from the dehydrochlorination. After a time the suspended calcium or magnesium hydroxide settles to a degree leaving an aqueous solution containing the dissolved chlorides which can be separated by filtration, centrifugation, or other techniques. The remaining suspension, containing the calcium or magnesium hydroxide, has almost the same composition as the initial suspension used to prepare the emulsion and, therefore, has not been consumed in the course of the reaction. As a result the suspension can be reused. While hydrated lime, in particular, is cheap, reuse makes its cost to a process so insignificant that this advantage alone constitutes an improvement over some existing or known alkaline dehydrochlorination processes. This reuse also minimizes a serious water pollution disposal problem and thereby represents a technological innovation. The Examples given below illustrate alkaline dehydrochlorination of the following types:

a. Dehydrochlorination using calcium hydroxide as the alkaline agent. This is typical of the prior art of "liming".
b. Dehydrochlorination using calcium hydroxide as an emulsifying agent and alkali metal hydroxide as the dehydrochlorinating agent.
c. Dehydrochlorination using magnesium hydroxide as an emulsifying agent and alkali metal hydroxide as the dehydrochlorinating agent.

EXAMPLE 1

To 290 g. of water are added 72 g. of hydrated lime (1.92 mole of hydroxyl ions) to form an aqueous suspension. To this suspension is added 215 g. of 1,1,2-trichlorethane (1.6 mole) and the mixture agitated to to form a stable emulsion. This is done in a one liter three neck flask equipped with a heating mantle, stirrer and reflux condenser. While maintaining agitation, the mixture was held between 50° and 65°C. for 500 minutes. The yield of 1,1-dichlorethylene from dehydrochlorination was about 10 percent of theoretical.

EXAMPLE 2

A second process was carried out as in Example 1 except that double the amount of hydrated lime was employed (i.e., 3.84 moles of hydroxyl ions). This time the yield of 1,1-dichlorethylene increased to approximately 58 percent of theoretical with a reaction time of 180 minutes.

EXAMPLE 3

One mole (134 g.) 1,1,2-trichlorethane was emulsified with an aqueous suspension consisting of 100 g. water and 20 g. hydrated lime in a five neck, baffled reaction flask employing a low RPM stirrer. The mixture was heated to 80°C. and one mole of 50 percent (aqueous) caustic soda was added through an addition funnel at a rate of about 2 ml/min. The temperature was maintained at 80°C. for 50 minutes while the 1,1-dichlorethylene was taken off through a partial condenser (45°C.) to a chilled receiver. The product was 94.6 percent 1,1-dichlorethylene and accounted for 81.2 percent of the theoretical yield.

EXAMPLE 4

A series of five process runs were carried out as in Example 3, except that the same suspension of hydrated lime was used successively for these runs. In this series the caustic addition per run was completed in about 26 minutes, and dehydrochlorination ceased shortly thereafter. The average composition of the product collected in the five runs was 92.0 percent 1,1-dichlorethylene and the average theoretical yield was 84.5 percent.

EXAMPLE 5

A process run using a 10 wt. percent aqueous magnesium hydroxide suspension in place of the hydrated lime of Example 4 was then carried out. Again the 50 percent (aqueous) alkali metal hydroxide was added to the heated aqueous emulsion of 1,1,2-trichlorethane and magnesium hydroxide and the ensuing product collected in a chilled receiver. The final product was 94.4 percent 1,1-dichlorethylene with a yield of 91 percent of theoretical.

EXAMPLE 6

A mixture of 265 g. (2 moles) 1,1,2-trichlorethane was emulsified with 190 g. water using 10 g. magnesium hydroxide (5 wt. percent aqueous suspension). The emulsion was heated to 85°C. and the addition of 2 moles of aqueous caustic soda solution was begun. Product collection ceased in 120 minutes at a final pot temperature of 90°C. The product was found to contain 94 percent 1,1-dichlorethylene and accounted for 74 percent of the theoretical yield.

EXAMPLE 7

The steps of Example 6 were repeated and aqueous sodium chloride solution and magnesium hydroxide suspension were removed and stored until the magnesium hydroxide settled forming a stable layer. The aqueous solution of sodium chloride was then separated from the concentrated magnesium hydroxide suspension by decanting and the remaining magnesium hydroxide was then used to form additional emulsion with 1,1,2-trichlorethane.

While the present invention has been illustrated and described with specific reference to calcium and magnesium as alkaline earth metals, it will be understood that the hydroxides or oxides of the other members of the second group of the periodic system, namely, strontium and barium may be used. Likewise, the other alkali metal hydroxides may be used such as potassium, rubidium and cesium hydroxides.

Having thus described our invention and having set forth the various examples of the invention, We claim:

1. A process for dehydrochlorinating 1,1,2-trichlorethane to 1,1-dichlorethylene comprising the following steps:
    A. Forming an aqueous emulsion comprising 1,1,2-trichlorethane and an alkaline earth metal hydroxide, said emulsion having a solids content from about 5 percent to about 30 percent by weight and having a volume ratio of aqueous slurry to trichlorethane of from about 1:2 to about 2:1;
    B. Forming an aqueous solution of an alkali metal hydroxide;
    C. Heating the aqueous emulsion of Step A to a temperature in the range from about 50°C. to about 85°C.;
    D. Adding a stoichiometric amount of the aqueous solution of Step B to the heated aqueous emulsion of Step C thereby forming 1,1-dichlorethylene; and
    E. Removing the 1,1-dichlorethylene thus formed.

2. The process of claim 1 in which the alkaline earth metal hydroxide is calcium hydroxide.

3. The process of claim 1 in which the alkaline earth metal hydroxide is magnesium hydroxide.

4. The process of claim 1 in which the alkali metal hydroxide is sodium hydroxide.

5. The process of claim 1 in which the alkaline earth metal hydroxide is calcium hydroxide and the alkali metal hydroxide is sodium hydroxide.

6. The process of claim 1 in which the alkaline earth metal hydroxide is magnesium hydroxide and the alkali metal hydroxide is sodium hydroxide.

7. The process of claim 1 in which the 1,1-dichlorethylene is continuously removed by steam distillation as the dehydrochlorination proceeds.

8. The process of claim 1 wherein the dehydrochlorination is carried out at a pressure greater than atmospheric.

9. The process of claim 1 further characterized by the steps of withdrawing alkali metal chloride aqueous solution and alkaline earth metal hydroxide suspension, storing the withdrawn portion until the hydroxide settles to a stable layer, separating the aqueous solution from the concentrated suspension and then using the alkaline earth metal hydroxide to form additional aqueous emulsion in step A.

* * * * *